UNITED STATES PATENT OFFICE.

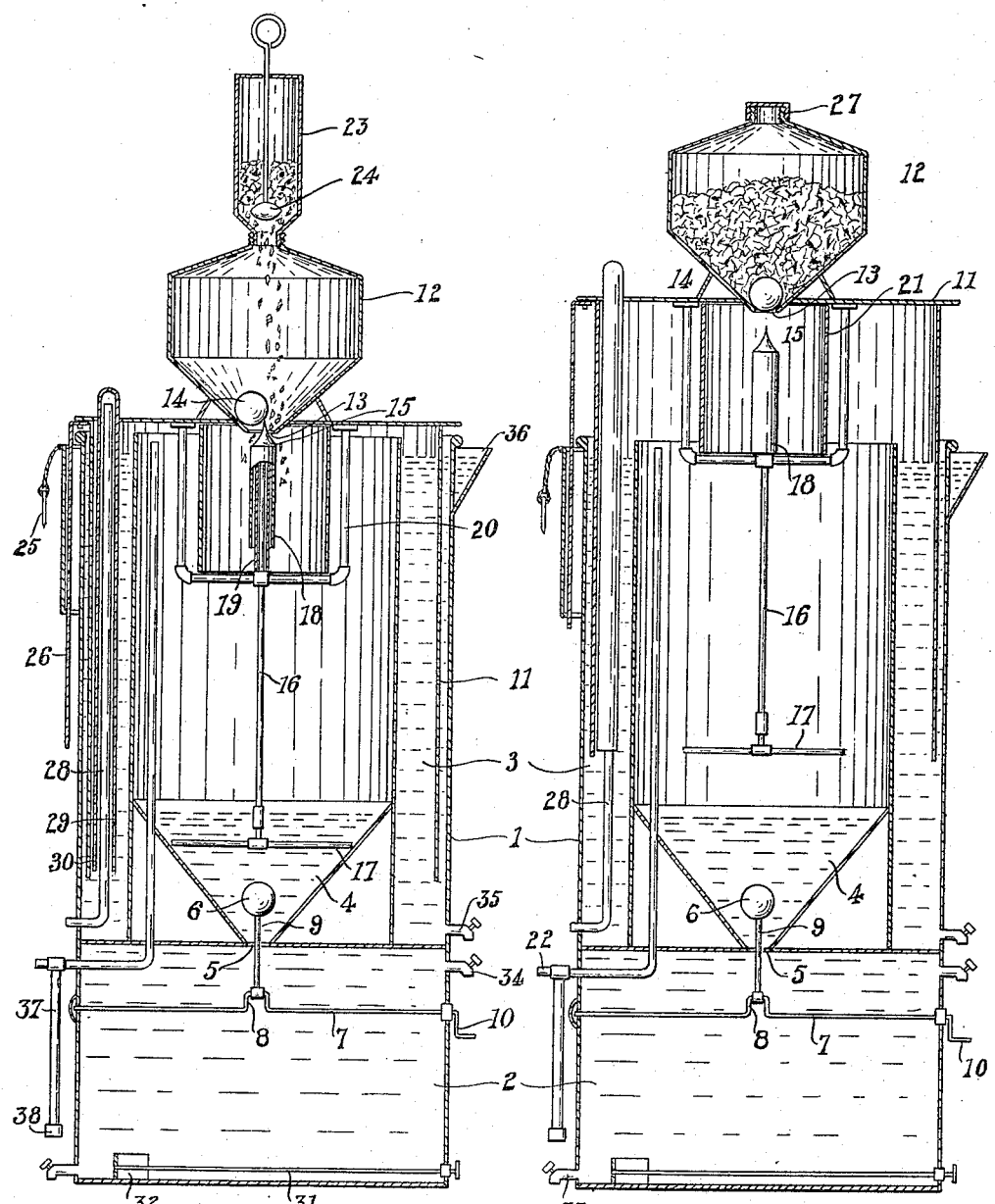

JAMES A. McCLAIN, OF ALVA, OKLAHOMA.

ACETYLENE-GAS GENERATOR.

1,168,895.  Specification of Letters Patent.  Patented Jan. 18, 1916.

Application filed February 28, 1914. Serial No. 821,632.

*To all whom it may concern:*

Be it known that I, JAMES A. McCLAIN, a citizen of the United States, and a resident of Alva, in the county of Woods and State of Oklahoma, have invented a new and useful Improvement in Acetylene-Gas Generators, of which the following is a specification.

My invention relates to acetylene gas generators and it has particular reference to generators in which calcium carbid is automatically fed to the water in the generator.

My invention has for its object to provide a generator which may be operated continuously without stopping for replenishing the supply of carbid or of water.

A further object of my invention is to provide a generator, the operation of which may be easily and conveniently initiated and which may be automatically controlled after its operation has begun.

In the operation of generators as usually constructed, it is necessary to discontinue the operation of the generator to replenish the supply of carbid in case the supply has been completely exhausted. It is also not possible in the ordinary machine to replace the water in the generator tank without suspending operation and in addition allowing the generator to become filled with air, which is not only dangerous but impairs the quality of gas furnished for some time.

I have provided a generator that is so arranged that the supply of carbid may be replenished at any time desired without suspending the operation of the generator. The carbid is fed automatically when the supply of gas has reached a predetermined minimum. The tank of the generator may be cleaned and the water replaced by a fresh supply without interfering with the generation of gas.

The above and other advantages will be apparent from a description of my invention in connection with the accompanying drawings in which—

Figure 1 is a view in vertical section, parts being broken away, of a generator constructed in accordance with my invention. Fig. 2 is a similar view showing the generator in operation.

A cylindrical tank 1 comprises a generating chamber 2 and an annular receptacle 3 both of which are adapted to receive a supply of water. A funnel shaped receptacle 4 is located immediately above the generating chamber 2 and is connected to the latter by a centrally disposed opening 5 that is controlled by a spherical valve 6. The valve is controlled by a rotatable shaft 7 having a crank arm 8 that is connected to the valve 6 by a rod 9 and having also a crank handle 10 exterior of the tank.

The lower end of a bell 11 is inserted into the water of the annular receptacle 3, thus forming a water seal to prevent the escape of gas. A carbid receptacle 12, that is supported upon the bell 11, is preferably of conical shape at its lower portion and is provided with a centrally disposed delivery opening 13. The supply of carbid is controlled by a ball valve 14 of brass, or other suitable material, and a pointed stem 15 that is connected to a feed rod 16. A crossbar 17, that is attached to the feed rod 16 at its lower end, is adapted to engage the side walls of the funnel shaped receptacle 4 when the bell 11 is in the lower portion of its path of movement. The stem 15 is connected also to a sleeve 18 that is slidably mounted upon a pipe 19, the latter forming a guide for the sleeve as it is actuated upwardly by the feed rod 16 or downwardly by gravity, as the case may be. The pipe 19 is fixed to the bell 11 by a frame 20. The sleeve 18 prevents the carbid from interfering with the reciprocating movement of the feed rod 16 within the pipe 19. A larger pipe 21 prevents the carbid from falling into the annular receptacle 3. The gas emerges from a pipe 22 as it is desired for use.

It may be assumed that the generator is being started into operation and that the various parts occupy their respective positions as shown in Fig. 1. A starting device comprising a small receptacle 23, that is provided with a manually operable valve 24 and that contains a small quantity of carbid, is screwed into the opening of the main carbid receptacle 12. It will be noted that owing to the position of the bell 11, the ball valve 14 is held open by the stem 15 so that carbid flows freely from the receptacle 23 into the funnel shaped receptacle 4 and through the opening 5 into the generating chamber 2. The gas thus generated operates to lift the bell 11 and allow the ball valve 14 to be seated. When the bell has risen a sufficient height, it is temporarily fastened by a pin 25 and a bar 26 to prevent its downward movement. The receptacle 23 is then removed and the receptacle 12 is filled with a suitable quantity of carbid after which a cap 27 is tightly screwed over the opening and the pin 25 is removed. The various parts are now in the position shown in Fig. 2 and the operation of the generator is automatically controlled. When the supply of gas diminishes to such an extent that the bell is lowered and the cross-bar 17 engages the side walls of the receptacle 4, further downward movement of the bell causes the ball valve to engage the stem 15 to permit carbid to enter the generating chamber 2. Because of the construction of the valve mechanism whereby the ball 14 is simultaneously moved laterally and upwardly by the stem 15, only a small movement of the latter relatively to the bell 11 is necessary to produce a comparatively large opening for the passage of carbid. This result is made possible by causing the opening to be produced substantially entirely on one side of the ball instead of being divided in case the ball were moved upwardly only. The effect is to permit the carbid to flow much more freely than is possible with the usual types of valves. Larger pieces of carbid may pass through the opening than is possible with a corresponding actuation of a valve which moves upwardly in a substantially straight line. Should the volume of gas become excessive at any time, a safety exhaust pipe 28 is effective when the bell is raised to such a position that an opening 29 in a pipe 30 surrounding the pipe 28, is above the surface of the water in the annular receptacle 3.

Since all of the gas generated in the chamber 2 must pass through the opening 5, it must also pass up through the water in the receptacle 4 and thus be washed by it. When it is desired to replace the water in the chamber 2, the shaft 7 is rotated by means of the crank 8 to cause the valve 6 to close the opening 5. The receptacle 4 then serves temporarily as a generating chamber so that the operation of the device is not stopped. An agitator rod 31 that is provided with a scraper 32 is then actuated to mix the sludge thoroughly with the water whereupon a draw-off cock 33 and an air cock 34 are opened to empty the chamber 2. A fresh supply of water is then poured into the chamber 2 through a suitable valved opening (not shown). Thus the generating chamber may be cleaned and the water replaced by a fresh supply without interfering with the action of the generator and without admitting any air into the gas chamber. The annular receptacle 3 is provided with a draw-off cock 35 and a funnel-shaped opening 36 through which water may be supplied as desired. A pipe or tube 37 having a removable cap 38 constitutes a trap for such water as may collect in the delivery pipe 22 and which would tend to prevent passage of the gas.

It will be noted that I have provided a generator which operates automatically to control the supply of carbid. A simple and convenient means for starting the generator and for replenishing the supply of carbid if it should become exhausted has also been provided. By means of the communicating receptacles, the operation of the generator may continue without interruption while the tank is cleaned and fresh water supplied. No air is admitted to the gas chamber while any of these operations are performed.

I claim as my invention:

1. In a gas generator, the combination with a generating chamber, and a bell relatively movable thereto, of a receptacle carried by said bell, a substantially spherical valve loosely mounted in said receptacle, and means comprising a pointed member carried by said bell and movable relatively thereto for engaging said valve to simultaneously move it upwardly and laterally.

2. In a gas generator, the combination with a generating chamber, and a receptacle having an opening communicating therewith, of a loosely mounted valve for controlling said opening, and means for engaging said valve whereby it is moved simultaneously upwardly and laterally.

3. In a gas generator, the combination with a generating chamber, and a receptacle having an opening communicating therewith, of a substantially spherical valve loosely mounted in said receptacle for controlling said opening, and a longitudinally movable member for engaging said valve to move it upwardly and laterally simultaneously.

4. In a gas generator, the combination with a generating chamber, and a container having an opening communicating therewith, of a substantially spherical valve loosely mounted in said opening, and a movable member having a pointed portion for engaging said valve to move it upwardly and laterally simultaneously in accordance with the volume of gas in said generator.

5. In a gas generator, the combination with a generating chamber comprising a movable bell, and a carbid container carried by said bell for supplying carbid to said chamber, of means for automatically controlling the supply of carbid, said means comprising a substantially spherical valve loosely mounted in said container, a pointed member for engaging said valve, and means for causing said member to engage said valve when the volume of gas in said generator reaches a predetermined minimum.

In testimony whereof, I have hereunto subscribed my name this 23d day of February, 1914.

JAMES A. McCLAIN.

Witnesses:
J. E. McCORMICK,
C. E. SCHAEFER.

Copies of this patent may be obtained for five cents each, by addressing the "Commissioner of Patents, Washington, D. C."